(12) United States Patent
Katagiri et al.

(10) Patent No.: US 8,693,129 B2
(45) Date of Patent: *Apr. 8, 2014

(54) TRANSPORT SPEED ADJUSTMENT DEVICE, TRANSPORT SPEED ADJUSTMENT METHOD AND TRANSPORT SPEED ADJUSTMENT PROGRAM FOR ADJUSTING TRANSPORT SPEED OF TAPE MEDIUM

(75) Inventors: Takashi Katagiri, Yokohama (JP); Hirokazu Nakayama, Fujisawa (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,828

(22) Filed: Apr. 27, 2012

(65) Prior Publication Data

US 2012/0206831 A1 Aug. 16, 2012

Related U.S. Application Data

(63) Continuation of application No. 13/002,894, filed as application No. PCT/JP2009/062199 on Jul. 3, 2009.

(30) Foreign Application Priority Data

Jul. 8, 2008 (JP) ................................. 2008-177986

(51) Int. Cl.
*G11B 15/46* (2006.01)
(52) U.S. Cl.
USPC ....................................................... 360/73.04
(58) Field of Classification Search
None
See application file for complete search history.

(56) References Cited

U.S. PATENT DOCUMENTS

| | | | |
|---|---|---|---|
| 5,944,802 A | 8/1999 | Bello et al. | |
| 5,969,897 A | 10/1999 | Morita | |
| 7,710,681 B2 | 5/2010 | Itagaki et al. | |
| 7,903,363 B2 | 3/2011 | Itagaki et al. | |
| 7,995,303 B2 | 8/2011 | Karp et al. | |
| 8,035,912 B2 | 10/2011 | Katagiri et al. | |
| 8,316,162 B2 | 11/2012 | Katagiri et al. | |
| 2005/0041317 A1 | 2/2005 | Jaquette | |
| 2005/0088771 A1 | 4/2005 | Jaquette et al. | |
| 2006/0256466 A1 | 11/2006 | Katagiri et al. | |

FOREIGN PATENT DOCUMENTS

| | | |
|---|---|---|
| JP | 04134526 A | 5/1992 |
| JP | 04265557 A | 9/1992 |
| JP | 05307444 A | 11/1993 |
| JP | 10199071 A | 7/1998 |
| JP | 2000-348432 | 12/2000 |
| JP | 2002-528835 | 9/2002 |
| JP | 2005063444 A | 3/2005 |
| JP | 2005-516340 | 6/2005 |
| JP | 2006318571 A | 11/2006 |
| JP | 2007-42159 | 2/2007 |
| WO | 0023992 | 4/2000 |
| WO | 03065374 A1 | 8/2003 |

*Primary Examiner* — K. Wong
(74) *Attorney, Agent, or Firm* — Griffiths & Seaton PLLC

(57) ABSTRACT

A tape drive capable of switching the transport speed of a tape medium among multilevel speeds calculates a data transfer rate from/to a host device, and selects an adjustment mode of the transport speed of the tape medium from a constant speed mode and a speed switch mode according to the calculated data transfer rate. The tape drive in the speed switch mode, pauses a data write or read operation to switch the transport speed of the tape medium while data is written at a first transport speed and when an available capacity of a buffer memory reaches a data volume to be received from the host device during switching of the transport speed and is read out at the first transport speed and when a data volume of a buffer memory reaches a data volume to be transmitted to the host device during switching of the transport speed.

12 Claims, 9 Drawing Sheets

| | FIRST TRANSFER RATE RANGE | ADJUSTMENT MODE |
|---|---|---|
| 1 | ○ OR HIGHER BUT LOWER THAN △ | SPEED SWITCH MODE |
| 2 | △ OR HIGHER BUT LOWER THAN □ | CONSTANT SPEED MODE |
| ... | ... | ... |

(a) MODE SELECTION TABLE

| LEVEL | TRANSPORT SPEED (m/sec) | SECOND TRANSFER RATE (MB/sec) |
|---|---|---|
| 1 | ● | ▲ |
| ... | ... | ... |

(b) ASSOCIATION TABLE

| | $(V_c, V_n)$ | REQUIRED TIME $(T_r)$ |
|---|---|---|
| 1 | (■, ▼) | ▽ |
| ... | ... | ... |

(c) REQUIRED TIME TABLE

FIG. 6

(a) TIMING FOR SWITCHING TO SECOND TRANSPORT SPEED (b) TIMING FOR SWITCHING TO FIRST TRANSPORT SPEED (a) TIMING FOR SWITCHING TO FIRST TRANSPORT SPEED (b) TIMING FOR SWITCHING TO SECOND TRANSPORT SPEED

TRANSPORT SPEED ADJUSTMENT DEVICE, TRANSPORT SPEED ADJUSTMENT METHOD AND TRANSPORT SPEED ADJUSTMENT PROGRAM FOR ADJUSTING TRANSPORT SPEED OF TAPE MEDIUM

CROSS-REFERENCE TO RELATED APPLICATIONS

The present application is a Continuation of U.S. patent application Ser. No. 13/002,894, filed on Jan. 6, 2011, which is a U.S. National Stage entry under 35 U.S.C. §371 based on International Application No. PCT/JP2009/062199, filed Jul. 3, 2009, which was published under PCT Article 21(2) and which claims priority to Japanese Patent Application No. 2008-177986, filed Jul. 8, 2008.

BACKGROUND OF THE INVENTION

1. Field of the Invention

The present invention relates to a method for adjusting a transport speed of a tape medium in a tape drive, especially to a method for optimally adjusting a transport speed of a linear recording tape medium in a tape drive.

2. Description of the Related Art

In general, during a data write operation, a tape drive temporarily stores data transmitted from a host device into a buffer memory, and thereafter reads out the stored data from the buffer memory to write the data into a tape medium. Similarly, during a data read operation, the tape drive temporarily stores data read out from the tape medium into the buffer memory, and thereafter reads out the stored data from the buffer memory to transmit the data to the host device. The tape drive performs these data write and read operations by causing relative movement between a head and the tape medium. Accordingly, in a tape drive, a data transfer rate between a tape medium and a buffer memory is proportional to a transport speed of the tape medium.

In a conventional tape drive, the tape medium is transported at a transport speed selected from the following two values so as not to make a host device wait, in the interest of a performance of the entire system. Specifically, if the tape medium can be transported at such a transport speed that makes a data transfer rate to/from the host device equal to a data transfer rate to/from the tape medium, this transport speed is selected. On the other hand, if this transport speed is impossible, such a transport speed that makes the data transfer rate to/from the tape medium higher than the data transfer rate to/from the host device is selected. However, when the tape medium is transported at such a transport speed that the data transfer rate to/from the tape medium higher than the data transfer rate to/from the host device, back hitches occur in the tape drive. Specifically, in this case, a back hitch occurs every time the buffer memory empties during a data write operation, and every time the buffer memory becomes full during a data read operation.

A back hitch is an operation of firstly reducing a transport speed of a tape medium to stop it for a while and then transporting the tape medium back to a predetermined position in order to reposition the tape medium to an appropriate data write or read out position. Since the back hitch is a burden to the tape medium, fewer the back hitches the better. For example, if the tape drive can be caused to constantly operate at such a transport speed that makes the data transfer rate to/from the host device equal to the data transfer rate to/from the tape medium, no back hitch occurs in the tape drive. However, in order to make the tape drive capable of constantly operating at such a transport speed that makes the data transfer rate to/from the tape medium equal to the data transfer rate to/from the host device, which can be any rate, the transport speed of the tape medium should be set switchable among on the order of 100 levels. However, this method is not realistic for the following reason.

It is known that an error rate during a data read operation depends on both a transport speed of the tape medium during the operation and a transport speed of the tape medium during a data write operation for the data to be read out. Thus, if the transport speed of the tape medium is set switchable among on the order of 100 levels, it should be checked that an error rate during a data read operation falls within a range specified in the specifications, for each of the multilevel transport speeds. However, this means that the above test should be conducted for 10000 combinations of the multilevel transport speeds.

For example, Japanese Patent Application Publication No. 2000-348432 discloses an example of a conventional technique for preventing decrease in data transfer efficiency between a tape drive and a host device to reduce damage on a tape medium caused by back hitches to a level equivalent to that caused by normal reproduction. Specifically, a magnetic record/reproduction system disclosed in Japanese Patent Application Publication No. 2000-348432 monitors a data volume in a buffer memory during a data reproduction operation, and outputs an instruction to decrease a transport speed of a magnetic tape in stages so as to decrease a data reproduction speed if a data transfer rate required by a host computer gets lower than a data read rate.

Meanwhile, Japanese Patent Application Publication No. 2007-42159 discloses an improved version of the technique disclosed in Japanese Patent Application Publication No. 2000-348432. Specifically, a data reproduction device disclosed in Japanese Patent Application Publication No. 2007-42159 is capable of switching a reproduction speed of a tape drive among multilevel speeds. The data reproduction device determines the number of memory regions in storage means each available for storing a group of data; and the number of memory regions in the storage means each storing therein a group of data ready for transmission to an external device, and switches the reproduction speed according to these determined numbers. In addition, Japanese Patent Application Publication No. 2007-42159 regards it as a problem that a back hitch will eventually occur in the magnetic record/reproduction system disclosed in Japanese Patent Application Publication No. 2000-348432 if it fails to pick up any data set during the switch of the reproduction speed or is likely to fail. Therefore, Japanese Patent Application Publication No. 2007-42159 discloses a technique of compensating for a data set that a data drive has failed to pick up, with an error correcting code (C2 parity or C3 parity), and thereby causing no back hitch operation to eventually occur during the switch of the reproduction speed.

SUMMARY OF THE INVENTION

If the technique disclosed in Japanese Patent Application Publication No. 2007-42159 is applied to a tape drive including a phase locked loop (PLL) in a locked condition to maintain a transport speed of a tape medium constant, some back hitches still occur therein during the switch of the transport speed. This is because, since such a tape drive performs a data write or read operation under the assumption that the PLL is in a locked condition and that the transport speed of the tape medium is constant, the data write or read operation needs to be stopped for a while during the switch of the transport speed of the tape medium. Accordingly, back hitches will inevitably occur in such a tape drive.

Note that the assumption that the PLL is in a locked condition and that the transport speed of the tape medium is constant is necessary for a track position of the tape medium and a linear recording density to fall within their allowances. In a tape drive, especially in a linear recording tape drive, an off-track displacement might result in the overwriting of data in an adjacent track. Meanwhile, if data is recorded in the tape medium with a linear recording density beyond the allowance, the tape drive might be unable to read out the data during a data read operation. Thus, the tape drive performs data write and read out operations under the assumption that the PLL is in a locked condition and that the transport speed of the tape medium is constant, and thereby assures that the track position of the tape medium and the linear recording density fall within their allowances.

Under such circumstances, the present invention has an object to provide a transport speed adjustment method, a transport speed adjustment device and a transport speed adjustment program that are capable of solving the above problems, that is, capable of reducing back hitches while preventing decrease in data transfer efficiency between a host device and a tape drive configured to stop a data write or read operation for a while during the switch of a transport speed of a tape medium.

It has been found that such an adjustment mode of a transport speed of a tape medium more effective in reducing back hitches varies with a change in a first transfer rate which is a data transfer rate between a host device and a tape drive. Hence, the present invention employs a configuration in which an adjustment mode of a transport speed of a tape medium is selected from multiple modes in accordance with a first transfer rate instead of employing a fixed adjustment mode of the transport speed of the tape medium. Specifically, the present invention to achieve the above object is implemented by the following transport speed adjustment device for adjusting a transport speed of a tape medium. According to the present invention, a tape drive capable of switching a transport speed of a tape medium among multilevel speeds includes receiving means, a buffer memory, transport means and writing means. The receiving means receives data from a host device through a network. The buffer memory temporarily stores the received data therein. The transport means transports the tape medium in a longitudinal direction thereof at a transport speed selected from multilevel transport speeds at which transport means can transport the tape medium. The writing means writes the data in the buffer memory into a track formed to extend in the transport direction of the tape medium. The above transport speed adjustment device is implemented by the foregoing tape drive further including the following means.

Specifically, the above transport speed adjustment device further includes transfer rate calculation means, mode selection means, transport speed setting means, required time obtaining means, threshold calculation means, monitoring means and speed adjustment means. The transfer rate calculation means calculates a first transfer rate which is a data transfer rate between the host device and the tape drive. The mode selection means selects, from adjustment modes consisting of a speed switch mode and a constant speed mode, an adjustment mode corresponding to the calculated first transfer rate, by referring to a mode selection table in which such an adjustment mode more effective in reducing back hitches is defined in accordance with the first transfer rate. Here, the transport speed is switched between a first transport speed and a second transport speed in the speed switch mode, while the transport speed is fixed at the second transport speed in the constant speed mode. The first transport speed is the highest speed of one or more transport speeds at which the transport means can be caused to operate under a condition that a second transfer rate, which is a data transfer rate between the buffer memory and the tape medium, is lower than the first transfer rate. The second transport speed is one-level higher than the first transport speed. The transport speed setting means causes the transport means to operate at the first transport speed at the beginning of data writing, in response to selection of the speed switch mode. The required time obtaining means obtains a time required to switch the transport speed of the tape medium from the first transport speed to the second transport speed, in response to the selection of the speed switch mode. The threshold calculation means calculates, from the first transfer rate and the obtained required time, a data volume expected to be received from the host device during switch of the transport speed, as a threshold. The monitoring means monitors an available data storage capacity of the buffer memory while data is written at the first transport speed in the speed switch mode, and outputs a first switch notice if the available capacity reaches the threshold. The speed adjustment means stops movement of the writing means and causes the transport means to operate at the second transport speed, in response to the first switch notice.

Preferably, the above transport speed adjustment device should further include compression means for compressing the received data before the data is stored in the buffer memory. The transfer rate calculation means calculates V/T as the first transfer rate, from a data volume V stored in the buffer memory in a time span T.

Preferably, the monitoring means should also monitor an available data storage capacity of the buffer memory while data is written at the second transport speed in the speed switch mode, and also outputs a second switch notice if the available capacity reaches the initial capacity of the buffer memory. The speed adjustment means should preferably also stop movement of the writing means and causes the transport means to operate at the first transport speed, in response to the second switch notice.

Preferably, the required time should include: a time required to pause transportation of the tape medium; a time required to rewind the tape medium for positioning of the writing means; and a time required to set the transport direction of the tape medium back to a normal transport direction and to switch the transport speed from the first transport speed to the second transport speed.

Preferably, the above transport speed adjustment device should further include a storage for storing therein a table. In the table, each of the multilevel transport speeds at which the transport means can be caused to operate is associated with one of aforementioned second transfer rates. Here, the associated second transfer rate is to be selected when the transport means is caused to operate at the transport speed. The transport speed setting means should preferably determine a transport speed at which the transport means is caused to operate, by referring to the table.

More preferably, the above transport speed adjustment device should further include management information adding means and correction information adding means. The management information adding means adds, to the data stored in the buffer memory, management information used for managing the data in the transport speed adjustment device. The correction information adding means adds, to the data stored in the buffer memory, error correction information used for performing error correction on the data. As the second transfer rate in the aforementioned table, V/T should more preferably be calculated from a data volume V firstly processed by both the management information adding means and the correction information adding means and then transmitted to the tape medium in a time span T.

In addition, the present invention to achieve the above object is also implemented by the following transport speed adjustment device for adjusting a transport speed of a tape medium. According to the present invention, a tape drive capable of switching a transport speed of a tape medium among multilevel speeds includes transport means, reading means, a buffer memory and transmitting means. The transport means transports the tape medium in a longitudinal direction thereof at a transport speed selected from multilevel transport speeds at which transport means can transport the tape medium. The reading means reads out data recorded in a track formed to extend in the transport direction of the tape medium. The buffer memory temporarily stores the read out data therein. The transmitting means transmits the data in the buffer memory to a host device through a network. The above transport speed adjustment device is implemented by the foregoing tape drive further including the following means.

Specifically, the above transport speed adjustment device further includes transfer rate calculation means, mode selection means, required time obtaining means, threshold calculation means, monitoring means and speed adjustment means. The transfer rate calculation means calculates a first transfer rate which is a data transfer rate between the host device and the transport speed adjustment device. The mode selection means selects, from adjustment modes consisting of a speed switch mode and a constant speed mode, an adjustment mode corresponding to the calculated first transfer rate, by referring to a mode selection table in which such an adjustment mode more effective in reducing back hitches is defined in accordance with the first transfer rate. Here, the transport speed is switched between a first transport speed and a second transport speed in the speed switch mode, while the transport speed is fixed at the second transport speed in the constant speed mode. The first transport speed is the highest speed of one or more transport speeds at which the transport means can be caused to operate under a condition that a second transfer rate, which is a data transfer rate between the buffer memory and the tape medium, is lower than the first transfer rate. The second transport speed is one-level higher than the first transport speed. The required time obtaining means obtains a time required to switch the transport speed of the tape medium from the first transport speed to the second transport speed, in response to the selection of the speed switch mode. The threshold calculation means calculates, from the first transfer rate and the obtained required time, a data volume expected to be transmitted to the host device during switch of the transport speed, as a threshold. The monitoring means monitors a data volume stored in the buffer memory while data is read out at the first transport speed in the speed switch mode, and outputs a first switch notice if the data volume reaches the threshold. The speed adjustment means stops movement of the reading means and causes the transport means to operate at the second transport speed, in response to the first switch notice.

Preferably, the above transport speed adjustment device should further include decompression means for decompressing the data read out from the buffer memory before the data is transmitted to the host device. In the tape medium, compressed data should preferably be recorded. The transfer rate calculation means should preferably calculate V/T as the first transfer rate, from a data volume V forwarded from the buffer memory to the decompression means in a time span T.

Preferably, the required time should include: a time required to pause transportation of the tape medium; a time required to rewind the tape medium for positioning of the reading means; and a time required to set the transport direction of the tape medium back to a normal transport direction and to switch the transport speed from the first transport speed to the second transport speed.

Preferably, the above transport speed adjustment device should further include transport speed setting means for causing the transport means to operate at the second transport speed at the beginning of data reading. Note that the second transport speed is also the lowest speed of one or more transport speeds at which the transport means can be caused to operate under a condition that the second transfer rate is higher than the first transfer rate. The monitoring means should preferably also monitor a data volume stored in the buffer memory while data is read out at the second transport speed in the speed switch mode, and also outputs a second switch notice if the data volume reaches the initial capacity of the buffer memory. The speed adjustment means should preferably also stop movement of the reading means and cause the transport means to operate at the first transport speed, in response to the second switch notice.

More preferably, the above transport speed adjustment device should further include a storage for storing therein a table. In the table, each of the multilevel transport speeds at which the transport means can be caused to operate is associated with one of aforementioned second transfer rates. Here, the associated second transfer rate is to be selected when the transport means is caused to operate at the transport speed. The transport speed setting means should more preferably determine a transport speed at which the transport means is caused to operate, by referring to the table.

More preferably, the above transport speed adjustment device should further include error correction means for performing error correction on the data stored in the buffer memory. As the second transfer rate stored in the table, V/T should more preferably be calculated from a data volume V firstly read out from the tape medium to the buffer memory and then processed by the error correction means in a time span T.

Hereinabove, the present invention has been described as a transport speed adjustment device for adjusting a transport speed of a tape medium. However, the present invention can also be conceived as a transport speed adjustment method to be employed in a tape drive capable of switching a transport speed of a tape medium among multilevel speeds and a transport speed adjustment program to be executed on such a tape drive.

According to the present invention, in a tape drive configured to stop a data write or read operation for a while during the switch of a transport speed of a tape medium, such an adjustment mode of a transport speed of a tape medium more effective in reducing back hitches is selected from adjustment modes consisting of a speed switch mode and a constant speed mode, in accordance with a first transfer rate which is a data transfer rate from/to a host device. In the speed switch mode, the transport speed of the tape medium is switched between a first transport speed and a second transport speed.

Here, the first transport speed makes a second transfer rate, which is a data transfer rate from/to the tape medium, lower than the first transfer rate, while the second transport speed is one-level higher than the first transport speed and makes the second transfer rate higher than the first transfer rate.

Meanwhile, the transport speed of the tape medium is fixed at the second transport speed in the constant speed mode. Each of the above conventional techniques employs a fixed method for adjusting a transport speed of a tape medium, that is, a fixed adjustment mode. By contrast, in the present invention, an optimum adjustment mode is selected in accordance with the first transfer rate. Thus, the present invention can reduce more back hitches than these conventional techniques. Moreover, the present invention assures secure data reception or transmission from/to the host device even during the switch of the transport speed of the tape medium. Accordingly, the present invention makes it possible to reduce back hitches while preventing decrease in data transfer efficiency between the tape drive and the host device. The other effects of the present invention will be understood from the following description of an embodiment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A shows an example of a mode selection table, according to the embodiment;

FIG. 6B shows an example of an association table, according to the embodiment;

FIG. 6C shows an example of a required time table, according to the embodiment;

DETAILED DESCRIPTION OF THE DRAWINGS

Figure 1:
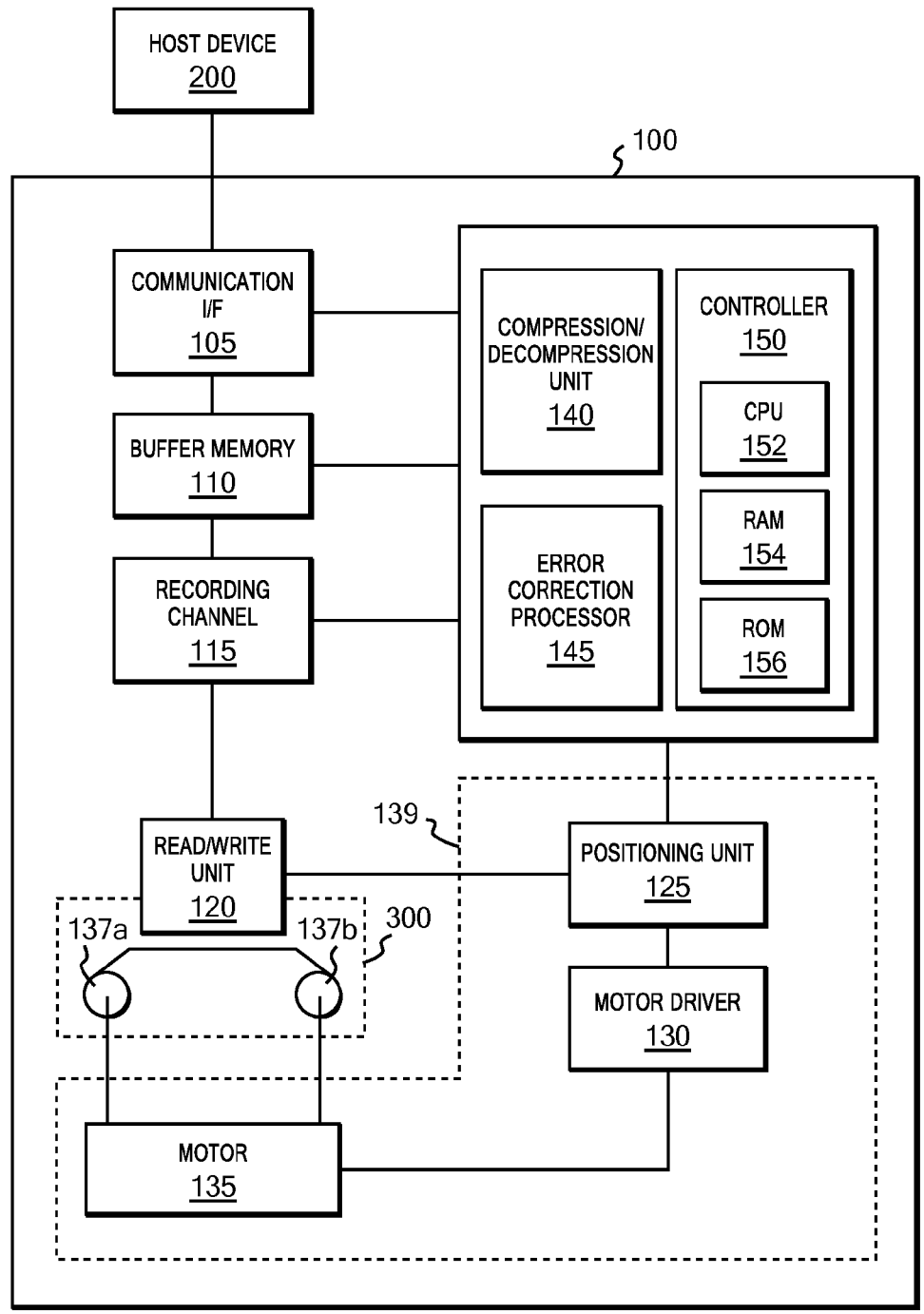
FIG. 1 shows an example of a hardware configuration of a tape drive to which the present invention can be applied.

Hereinbelow, detailed description will be given of an embodiment of the present invention with reference to the drawings. Note, however, that the embodiment to be described below does not limit the present invention defined by the scope of the claims, and that not all the combinations of the features described in the embodiment are essential for the solving means of the present invention. Throughout the following embodiment, the same elements are denoted by the same reference numerals.

In the following description of the present invention, a tape drive complying with the linear tape open (LTO) standard is taken as an example. The LTO standard is an open format standard developed jointly by Hewlett-Packard Company, IBM Corporation, and Seagate Technology LLC.

FIG. 1 shows an example of a hardware configuration of a tape drive 100 complying with the LTO standard. The embodiment of the present invention is applied to the tape drive 100. The tape drive 100 includes a communication interface 105, a buffer memory 110, a recording channel 115, a read/write unit 120, a positioning unit 125, a motor driver 130, a motor 135 and a controller 150. In addition, the tape drive 100 according to this embodiment also includes a compression/decompression unit 140 and an error correction processor 145.

The communication interface 105 communicates with a host device 200. For example, the communication interface 105 receives, from the host device 200, user data to be written in a tape medium 300 and a write command to instruct the tape drive 100 to write the data in the tape medium 300.

The tape drive 100 is connected to the host device 200 through a small computer system interface (SCSI) and a network such as a local area network (LAN). Alternatively, the tape drive 100 may be connected to the host device 200 through a network such as a dedicated line or the Internet. Still alternatively, the tape drive 100 may be connected to an information processor such as a personal computer through a communication interface such as a SCSI interface or a LAN to be eventually connected to the host device 200 through the information processor.

The buffer memory 110 temporarily stores therein data to be written in the tape medium 300 and data read out from the tape medium 300, and is configured with, for example, a dynamic random access memory (DRAM). The buffer memory 110 according to this embodiment is partitioned into segments each having a size of approximately 2 megabytes, which is equal to the size of a data set treated as a unit data in the tape drive 100 complying with the LTO standard.

The recording channel 115 is a communication channel used for writing, into the tape medium 300, data stored in the buffer memory 110, and for temporarily storing data read out from the tape medium 300 into the buffer memory 110.

The read/write unit (read/write head) 120 has a data-read/write element, thereby writes data into the tape medium 300 and reads out data from the tape medium 300. In addition, the read/write unit 120 according to this embodiment also has a servo read element and thereby reads out a signal from servo tracks provided on the tape medium 300.

The positioning unit 125 instructs the read/write unit 120 to move in a direction (width direction) parallel to the shorter sides of the tape medium 300. Reels 137a and 137b rotates to move the tape medium 300 in a direction from the reel 137a to the reel 137b or in a direction from the reel 137b to the reel 137a. The motor driver 130 drives the motor 135, and the motor 135 controls rotation of the reels 137a and 137b to transport the tape medium 300 in the longitudinal direction thereof. Note that, hereinbelow, the positioning unit 125, the motor driver 130 and the motor 135 are collectively referred to as a transport unit 139. The transport unit 139 according to the present invention is capable of switching among different transport speeds of the tape medium 300.

When the communication interface 105 receives data during a data write operation, the compression/decompression unit 140 compresses the received data before the data is stored in the buffer memory 110. The data compressed by the compression/decompression unit 140 is stored in the buffer memory 110 in a manner that each data set is stored in a segment of the buffer memory 110. On the other hand, when the compressed data read out from the tape medium 300 is stored in the buffer memory 110 during a data read operation, the compression/decompression unit 140 decompresses the compressed data before the data is transmitted to the host device 200 through the communication interface 105.

The controller 150 controls the whole tape drive 100. Specifically, the controller 150 controls the writing of data into the tape medium 300 and the reading out of data from the tape medium 300 according to a command received through the communication interface 105. In addition, the controller 150 controls the transport unit 139 to adjust the transport speed of the tape medium 300. The controller 150 according to the present invention causes, at an appropriate timing, the transport unit 139 to transport the tape medium 300 at an appropriate transport speed so as to reduce back hitches while preventing decrease in data transfer efficiency between the tape drive 100 and the host device 200. The transport speed adjustment performed by the controller 150 will be described in detail later.

During the data write operation, the controller 150 according to this embodiment also creates a management information piece indicating contents of a data set stored in each segment of the buffer memory 110 and stores each management information piece in a segment including the corresponding data set. Such a management information piece is called a data set information table (DSIT). Note that, during the data read operation, the management information pieces respectively added to the data sets in the segments are not transmitted to the host device 200.

The foregoing controller 150 is implemented by a CPU 152, a RAM 154 and a ROM 156. Here, the ROM 156 stores therein a boot program executed by the CPU 152 in the boot-up of the tape drive 100 and programs causing the controller 150 to provide the above functions after the tape drive 100 is booted, such as a transport speed adjustment program according to the present invention. The CPU 152 executes these programs by using the RAM 154.

During the data write operation, the error correction processor 145 calculates an error correcting code (hereinbelow, referred to as ECC) for a data set stored in each segment of the buffer memory 110, and adds the calculated ECC to the data set. In addition, during the data read operation, the error correction processor 145 performs error correction on a data set stored in each segment of the buffer memory 110 by using the ECC added to the data set.

Figure 2:
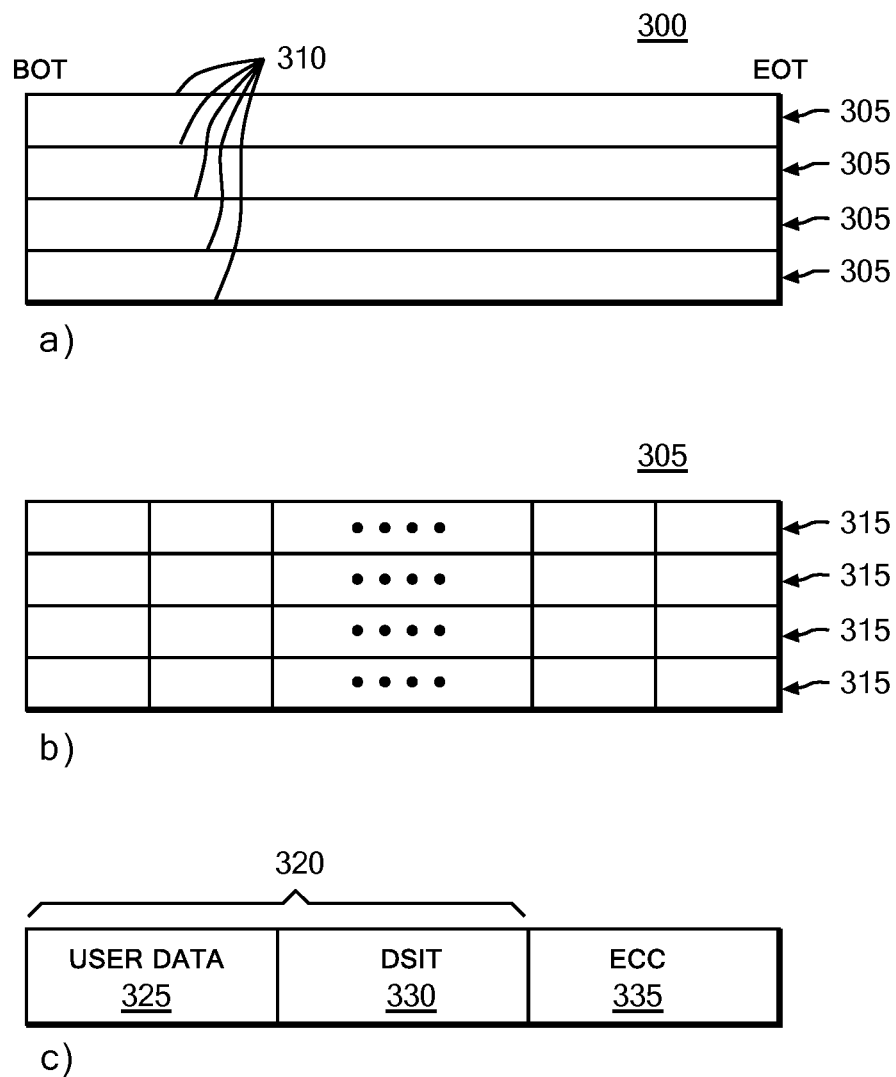
FIG. 2A shows an example of a configuration of a recording area of a tape medium, according to an embodiment of the present invention
FIG. 2B shows an example of a configuration of a band.
FIG. 2C shows an example of a configuration of a data set.

FIGS. 2A to 2C show an example of a configuration of a recording area of the tape medium 300 according to this embodiment. The tape medium 300 has multiple bands 305 arranged to extend in the longitudinal direction of the tape medium 300 from the beginning of tape (BOT) to the end of tape (EOT) as shown FIG. 2A. In addition, servo tracks 310 are provided on both longitudinal sides of each of the multiple bands 305 to extend in the longitudinal direction. Each servo track 310 is used to control a data writing position or a data reading position.

As shown in FIG. 2B, each band 305 has multiple data tracks 315 arranged to extend in the longitudinal direction of the tape medium 300. Each data track 315 includes multiple data sets 320 arranged side by side in the longitudinal direction of the tape medium 300. As shown in FIG. 2C, each data set 320 includes: a user data set 325 transmitted from the host device 200; and a DSIT 330 which is a management information piece for the user data set 325. In addition, an ECC 335 calculated by the above error correction processor 145 is also added to each data set 320 according to this embodiment.

Figure 3:
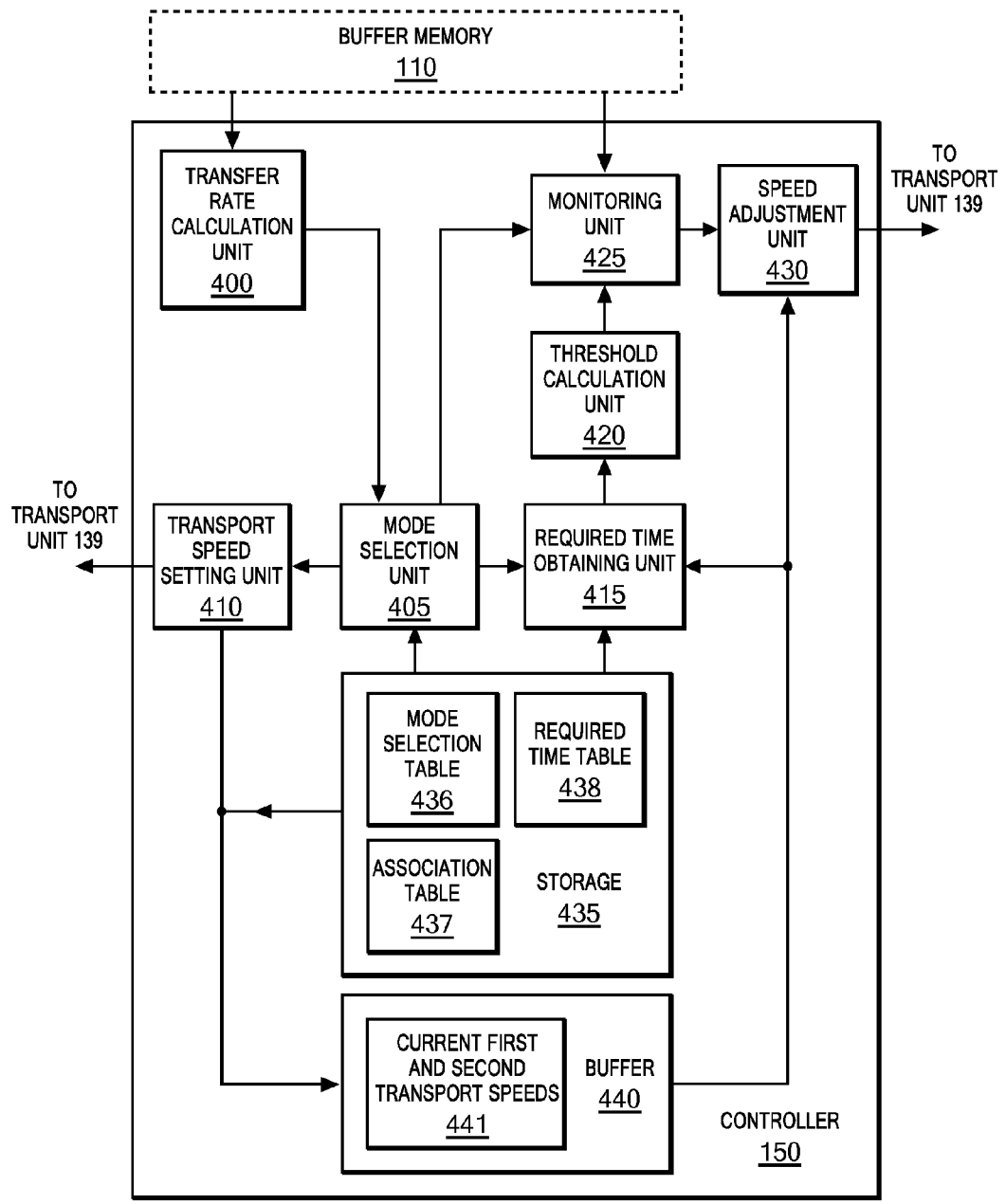
FIG. 3 shows an example of a functional configuration of a controller, according to the embodiment of the present invention.

FIG. 3 shows an example of a functional configuration of the controller 150 according to this embodiment. As described above, the controller 150 according to this embodiment has a function of adjusting a transport speed of the tape medium 300 in addition to typical functions of a controller of a tape drive in order to reduce back hitches while preventing decrease in data transfer efficiency between the tape drive 100 and the host device 200. The controller 150 having the function of adjusting a transport speed of the tape medium 300 as described above includes a transfer rate calculation unit 400, a mode selection unit 405, a transport speed setting unit 410, a required time obtaining unit 415, a threshold calculation unit 420, a monitoring unit 425, a speed adjustment unit 430, a storage 435 and a buffer 440.

The transfer rate calculation unit 400 calculates a first transfer rate which is a data transfer rate between the host device 200 and the tape drive 100. For example, the transfer rate calculation unit 400 may calculate v/t as a first transfer rate during the data write operation from a data volume v received by the communication interface 105 in a time span t. Alternatively, if the tape drive 100 compresses data received from the host device 200, the transfer rate calculation unit 400 may calculate V/t as the first transfer rate during the data write operation from a compressed data volume V stored in the buffer memory 110 in a time span t. Still alternatively, in this case, the transfer rate calculation unit 400 may calculate v/C/t as the first transfer rate during the data write operation by using a data volume v received by the communication interface 105 in a time span t, and a compression rate C.

Similarly, the transfer rate calculation unit 400 may calculate v/t as a first transfer rate during the data read operation from a data volume v transmitted by the communication interface 105 in a time span t, for example. Alternatively, if the tape drive 100 decompresses data read out from the tape medium 300, the transfer rate calculation unit 400 may calculate V/t as the first transfer rate during the data read operation from a data volume V transmitted to the compression/decompression unit 140 from the buffer memory 110 in a time span t. Still alternatively, in this case, the transfer rate calculation unit 400 may calculate v/C/t as the first transfer rate during the data read operation by using a data volume v transmitted by the communication interface 105 in a time span t, and the compression rate C. Each first transfer rate calculated by the transfer rate calculation unit 400 is given to the mode selection unit 405 to be described later.

The mode selection unit 405 selects, from adjustment modes of the transport speed of the tape medium 300 consisting of a speed switch mode and a constant speed mode, an adjustment mode corresponding to the calculated first transfer rate, by referring to a mode selection table 436 in which such adjustment modes more effective in reducing back hitches are defined in accordance with first transfer rates. In the speed switch mode, the transport speed of the tape medium 300 is switched between a first transport speed and a second transport speed, while the transport speed of the tape medium 300 is fixed at the second transport speed in the constant speed mode. Here, the first transport speed is the highest speed of one or more transport speeds at which the transport unit 139 can be caused to operate under a condition that a second transfer rate, which is a data transfer rate between the buffer memory 110 and the tape medium 300, is lower than the first transfer rate. On the other hand, the second transport speed is one-level higher than the first transport speed. Note that the second transport speed is also the lowest speed of one or more transport speeds at which the transport unit 139 can be caused to operate under a condition that the second transfer rate is higher than the first transfer rate. Together with the first transfer rate calculated by the transfer rate calculation unit 400, the selection result of the mode selection unit 405 is given to the transport speed setting unit 410 to be described later, and, if the speed switch mode is selected, also given to the required time obtaining unit 415. In addition, the selection result of the mode selection unit 405 is given to the monitoring unit 425, too.

Figure 4:
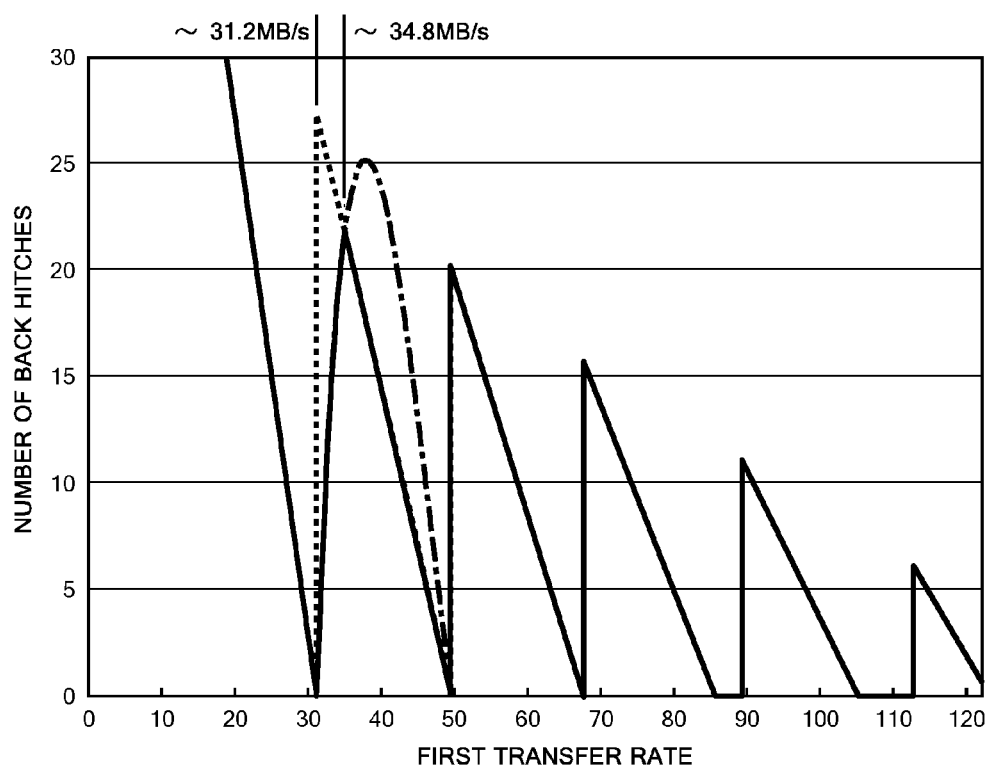
FIG. 4 is a graph showing relations of the number of back hitches to transfer rates between a host device and a conventional tape drive and between the host device and the tape drive to which the present invention is applied.
Figure 5:
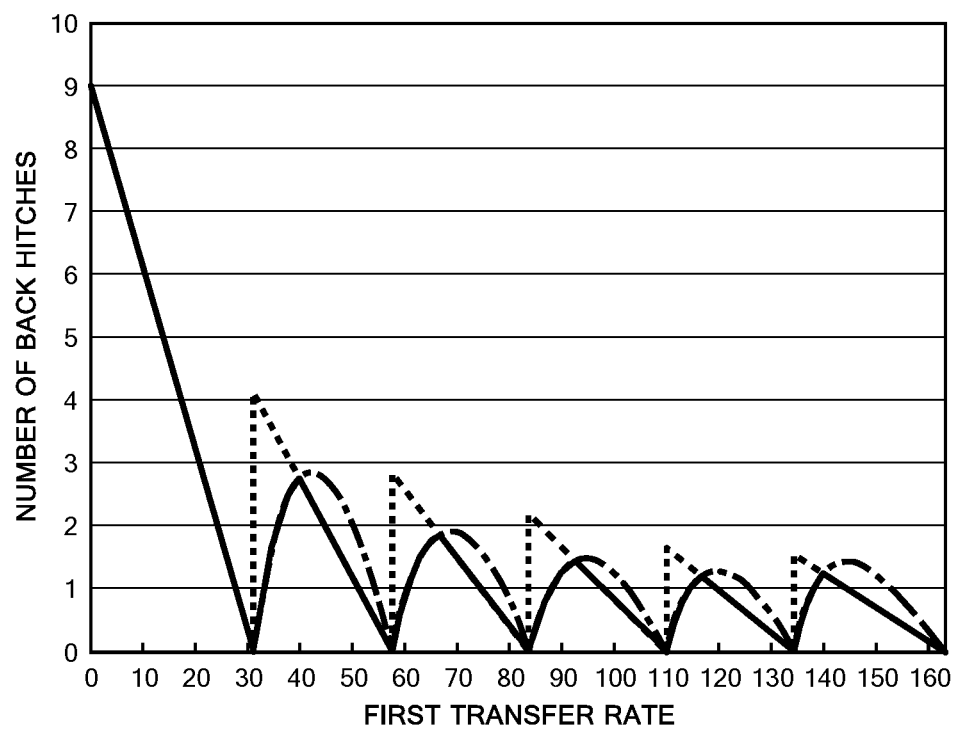
FIG. 5 is a graph showing relations of the number of back hitches to transfer rates between a host device and a conventional tape drive with a larger buffer memory, and between the host device and the tape drive with a larger buffer memory to which the present invention is applied.

Hereinbelow, by referring to FIGS. 4 and 5, it will be explained that such an adjustment mode of the transport speed of the tape medium 300 more effective in reducing back hitches varies with a change in the first transfer rate. FIGS. 4 and 5 each show the numbers of back hitches in a certain time period in different transfer rates between the host device 200 and the tape drive 100. In each of FIGS. 4 and 5, the horizontal axis represents the first transfer rate, which is the data transfer rate between the host device 200 and the tape drive 100 while the vertical axis represents the number of back hitches in a certain time period (hereinbelow, simply referred to as the number of back hitches). In addition, in each of FIGS. 4 and 5, the dotted line represents data obtained when the tape drive 100 operates constantly in the constant speed mode where the transport speed of the tape medium 300 is fixed at the second transport speed. Meanwhile, the dashed-dotted line represents data obtained when the tape drive 100 operates constantly in the speed switch mode where the transport speed of the tape medium 300 is switched between the first and second transport speeds at appropriate timings according to the result of monitoring the buffer memory 110.

As is clear from FIG. 4, such an adjustment mode more effective in reducing back hitches varies between the constant speed mode and the speed switch mode with a change in the first transfer rate. For example, while the first transfer rate is in a range from 31.2 MB/s to 34.8 MB/s, the number of back hitches is smaller in the speed switch mode. On the other hand, while the first transfer rate is in a range from 34.8 MB/s to 48 MB/s, the number of back hitches is smaller in the constant speed mode. Accordingly, the present invention employs a configuration for selecting such an adjustment mode more effective in reducing back hitches in accordance with the first transfer rate. In FIG. 4, the solid line represents data obtained when the tape drive 100 according to the present invention actually operates. By applying the present invention to the tape drive 100, the number of back hitches required when the first transfer rate is 31.2 MB/s can be reduced to 0 from 27 that is required in the tape drive 100 caused to operate constantly in the constant speed mode. In addition, by applying the present invention to the tape drive 100, the peak value of the required number of back hitches in a first transfer rate range from 31.2 MB/s to 49 MB/s can be reduced to 22 from 27 that is required in the tape drive 100 caused to operate constantly in the constant speed mode, and from 25 that is required in the tape drive 100 caused to operate constantly in the speed switch mode. Note that, as is clear from FIG. 4, when the first transfer rate is 49 MB/s or higher, the number of the back hitches is always smaller in the constant speed mode.

FIG. 5 shows data obtained by using the tape drive 100 including the buffer memory 110 with a larger capacity than the buffer memory 110 of the tape drive 100 used for obtaining the data shown in FIG. 4. As is clear from FIG. 5, such an adjustment mode more effective in reducing back hitches repeatedly varies between the constant speed mode and the speed switch mode in a first transfer rate range from 30 MB/s to 160 MB/s. However, by applying the present invention to the tape drive 100, each of the peak values of the number of back hitches observed in a first transfer rate range from 30 MB/s to 110 MB/s can be approximately halved. As described above, though back hitches can be reduced by applying the present invention to the tape drive 100, the magnitude of the effect of this application also depends on the capacity of the buffer memory 110 included in the tape drive 100.

Note that at least one mode selection table 436 to which the mode selection unit 405 refers is previously stored in the storage 435 to be described later. Then, description will hereinbelow be given of a method for creating the mode selection table 436 to be stored in the storage 435. As described above, in the mode selection table 436, such adjustment modes more effective in reducing back hitches selected from the constant speed mode and the speed switch mode are defined in accordance with first transfer rates. FIG. 6A shows an example of the mode selection table 436. In the mode selection table 436 shown in FIG. 6A, an adjustment mode to be selected is associated with each range of the first transfer rate. To take the data shown in FIG. 4 as an example, the first transfer rate of 31.2 MB/s or higher but lower than 34.8 MB/s is associated with the speed switch mode while the first transfer rate of 34.8 MB/s or higher but lower than 48 MB/s is associated with the constant speed mode. Alternatively, the mode selection table 436 may list ranges of the first transfer rate at which the speed switch mode (or the constant speed mode) is to be selected.

Regardless of the type of the mode selection table 436, in order to create the mode selection table 436, it is necessary to obtain the first transfer rate at each exact time when such an adjustment mode more effective in reducing back hitches varies between the constant speed mode and the speed switch mode. Such first transfer rate values are: first transfer rate values $C1, C2, \ldots$, at the intersections of the dotted line and the dashed-dotted line in each of FIGS. 4 and 5; and first transfer rate values $E1, E2, \ldots$, at the points where the number of back hitches is 0. Once the first transfer rate values $C1, C2, \ldots$, and $E1, E2, \ldots$, are obtained, the mode selection table 436 can be created by associating the first transfer rate in each range with either adjustment mode as follows. Specifically, for example, the first transfer rate of the first transfer rate value $C1$ or higher but lower than the first transfer rate value $E1$ is associated with the constant speed mode, the first transfer rate of the first transfer rate value $E1$ or higher but lower than the first transfer rate value $C2$ is associated with the speed switch mode, and so forth for all remaining ranges.

Hence, how to obtain the first transfer rate values $C1, C2, \ldots$, will be considered below. To begin with, it is assumed that the first transfer rate is $V1$, the second transfer rate corresponding to the first transport speed Vc is V2(Vc), the second transfer rate corresponding to the second transport speed Vn is V2(Vn), the capacity of the buffer memory 110 is Vb, the capacity of each data track 315 is Vt, and the data volume read out from or written in the buffer memory 110 during an operation of switching the transport speed of the tape medium 300 is Va. Note that the first transfer rate V1 is assumed to be constant during the data write and read operations.

Firstly, the number of back hitches in the constant speed mode is calculated. To take the data read operation as an example, if the buffer memory 110 becomes full while the transport unit 139 in the constant speed mode is transporting the tape medium 300 at the second transport speed Vn, the transport unit 139 stops the tape medium 300 and waits for the buffer memory 110 to empty while stopping the tape medium 300. Thus, in the constant speed mode, one back hitch attributable to pause in the transportation of the tape medium 300 occurs per a cycle time, that is, the total time of: a time Vb/(V2(Vn)−V1) taken for the empty buffer memory 110 to be filled to its capacity; and a time Vb/V1 taken for the full buffer memory 110 to empty. Thus, the number X of back hitches in the constant speed mode occurring per a time Vt/V1 required to read out data sets from each data track 315 is obtained from the following equation:

$$X=(Vt/V1)/(Vb/(V2(Vn)-V1)+Vb/V1) \quad (1).$$

Next, the number of back hitches in the speed switch mode is calculated. To take the data read operation as an example similarly to the above, if the buffer memory 110 becomes full while the transport unit 139 in the speed switch mode is transporting the tape medium 300 at the second transport speed Vn, the transport unit 139 switches the transport speed of the tape medium 300 to the first transport speed Vc. Then, the transport unit 139 transporting the tape medium 300 at the first transport speed Vc switches the transport speed of the tape medium 300 to the second transport speed Vn immediately before the buffer memory 110 becomes full, in other words, if an available capacity of the buffer memory 110 becomes Vb−Va. Thus, in the speed switch mode, two back hitches attributable to switch of the transport speed of the tape medium 300 occur per a cycle time, that is, the total time of: a time Vb/(V2(Vn)−V1) taken for the empty buffer memory 110 to be filled to its capacity; and a time (Vb−Va)/(V1−V2(Vc)) taken for the full buffer memory 110 to become almost empty. Thus, the number X of back hitches in the speed switch mode occurring per a time Vt/V1 required to read out data sets from each data track 315 is obtained from the following equation:

$$X=2*(Vt/V1)/(Vb/(V2(Vn)-V1)+(Vb-Va)/(V1-V2(Vc))) \quad (2).$$

Note that the tape drive 100 according to the present invention switches the transport speed from the first transport speed Vc to the second transport speed Vn at the timing when a data volume stored in the buffer memory 110 becomes the data volume Va. Here, Va is the data volume to be read out from the buffer memory 110 during an operation of switching the transport speed, as described above. This allows the tape drive 100 according to the present invention to prevent decrease in data transfer efficiency between the tape drive 100 and the host device 200. It is quite apparent that the data volume Va is proportional to the first transfer rate. The method for calculating the data volume Va will be described in detail later.

The final values to be obtained here, that is, the first transfer rate values C1, C2, . . . , at the exact times when such an adjustment mode more effective in reducing back hitches varies between the two modes, are determined by the equality of the right-hand sides of the respective above equations (1) and (2). Incidentally, if the transport unit 139 can be caused to operate at such a transport speed that equalizes the first and second transfer rates, no back hitch occurs in the tape drive 100. Accordingly, the other first transfer rate values E1, E2, . . . , can be determined as follows. In the speed switch mode, the number of back hitches becomes 0 when the first transfer rate V1 becomes equal to either the second transfer rate V2(Vc) corresponding to the first transport speed Vc or the second transfer rate V2(Vn) corresponding to the second transport speed Vn. On the other hand, in the constant speed mode, the number of back hitches gets closer to 0 as the first transfer rate V1 gets closer to the second transfer rate V2(Vn) corresponding to the second transport speed Vn.

Incidentally, the above equations (1) and (2) for the number X of back hitches hold under the assumption that the first transfer rate V1 is constant during the data write and read operations. Hence, how to obtain the number X of back hitches when the first transfer rate V1 is not constant during the data write and read operations will be considered below. Firstly, suppose the case where the first transfer rate V1 changes at a uniform rate from the first transfer rate V1_1 at the beginning of each data track 315 to the first transfer rate V1_2 at the end of the data track 315. In this case, a time T required to read out data sets from each data track 315 is Vt/((V1_1+V1_2)/2). Thus, V1 is regarded as a function V1(t) of a time t in the above equations (1) and (2), and then the integrals of the above entire equations (1) and (2) are calculated over the interval of the time t from 0 to T, which is defined as above. As a result, the number X of back hitches in the case where the first transfer rate V1 changes at a uniform rate during the data write and read operations is obtained. After that, with similar procedures as used when the first transfer rate V1 is assumed to be constant during the data write and read operations, the first transfer rate values at the exact times when such an adjustment mode more effective in reducing back hitches varies between the two modes can be obtained.

As long as the first transfer rate V1 changes at a uniform rate, it makes no difference whether the first transfer rate V1 changes gradually or rapidly. However, if the first and second transport speeds Vc and Vn change with a change in the first transfer rate V1, it is necessary to regard Vc and Vn as functions Vc(t) and Vn(t) of a time t, respectively, and then to calculate the integrals of the above entire equations (1) and (2) over the interval of the time t from 0 to T. For example, assume the case where the first transfer rate V1 becomes higher than the second transfer rate V2(Vn) at a time point tx. In this case, the integrals of the above equations (1) and (2) are calculated where Vn(t) returns the second transport speed Vn, which is a value before change, in 0≤t<tx, and where Vn(t) returns a transport speed one-level higher than the second transport speed Vn in tx≤t<T.

If the first transfer rate V1 increases and reduces in a certain range during the data write and read operations as well, the first transfer rate values at the exact times when such an adjustment mode more effective in reducing back hitches varies between the two modes can be obtained with similar procedures as used when the first transfer rate V1 is assumed to be constant. Note, however, that a time T required to read out data sets from each data track 315 is Vt/V1 in this case.

As described above, the mode selection table 436 can be created irrespective of whether or not the first transfer rate V1 is constant. In the tape drive 100 supporting the case where the first transfer rate V1 is not constant, the storage 435 stores therein the mode selection tables 436 for the respective cases where the first transfer rate V1 is constant, where the first transfer rate V1 changes at a uniform rate, and where the first transfer rate V1 changes in a certain range, during the data write and read operations. Meanwhile, the transfer rate calculation unit 400 periodically calculates the first transfer rate V1, and estimates, from the history thereof, how the first transfer rate V1 will change thereafter. Upon receipt of the estimate result from the transfer rate calculation unit 400, the mode selection unit 405 selects an appropriate mode selection table 436 on the basis of the estimate result, and thereafter selects an adjustment mode corresponding to the calculated first transfer rate by referring to the selected mode selection table 436.

The storage 435 is implemented by the ROM 156 shown in FIG. 1, and previously stores therein an association table 437 and a required time table 438 in addition to at least one mode selection table 436. In the association table 437, each of the multilevel transport speeds at which the transport unit 139 can be caused to operate is associated with a second transfer rate to be selected when the transport unit 139 is caused to operate at the transport speed (see FIG. 6B). In the tape drive 100, data is written in or read out from the tape medium 300 by causing relative movement between the read/write head 120 and the tape medium 300. Accordingly, the second transfer rate is proportional to the transport speed of the tape medium 300, and thus can be adjusted through adjustment of the transport speed of the tape medium 300.

Note that, during the data write operation, the controller 150 according to this embodiment also functions as a management information adding unit to create a DSIT 330 for a data set stored in each segment of the buffer memory 110, as has been described previously. In addition, the tape drive 110 according to this embodiment includes the error correction processor 145 which adds an ECC 335 to a data set stored in each segment of the buffer memory 110, during the data write operation. Here, the ECC 335 is an error correction information piece, as described above. Similarly, during the data read operation, the error correction processor 145 performs error correction on a data set stored in each segment of the buffer memory 110 by using the ECC 335 added to the data set.

Accordingly, as a second transfer rate to be registered in the association table 437, V/t may be calculated from a data volume V firstly processed by both the controller 150 functioning as the management information adding unit and the error correction processor 145 and then transmitted from the buffer memory 110 to the tape medium 300 in a time span t. Similarly, as another second transfer rate to be registered in the association table 437, V/t may be calculated from a data volume V firstly read out from the tape medium 300 into the buffer memory 110 and then processed by the error correction processor 145 in a time span t. Employment of these second transfer rates helps the speed adjustment unit 430 to more accurately adjust the transport speed of the tape medium 300 as to be described later. Note, however, that there is no problem to ignore a time required for the error correction since the error correction is executed by hardware. By contrast, the management information addition is executed using a microcode and requires a certain time. However, a series of processes during the data write or read operation including the data compression/decompression, the error correction and the management information addition are performed in parallel by pipelining, for each data set. Accordingly, none of these processes will be a bottleneck, and thus there is no problem to ignore a time required for the processes.

In the required time table 438, a time required to switch from a first transport speed to a second transport speed is associated with the first and second transport speeds (see FIG. 6C). Here, the second transport speed is one-level higher than the first transport speed, as described above. The time required for such a transport speed switch includes: a time required to pause the transportation of the tape medium 300; a time required to rewind the tape medium 300 for the positioning of the read/write head 120; and a time required to set the transport direction of the tape medium 300 back to the normal transport direction and to switch from a first transport speed to a second transport speed.

Figure 7:
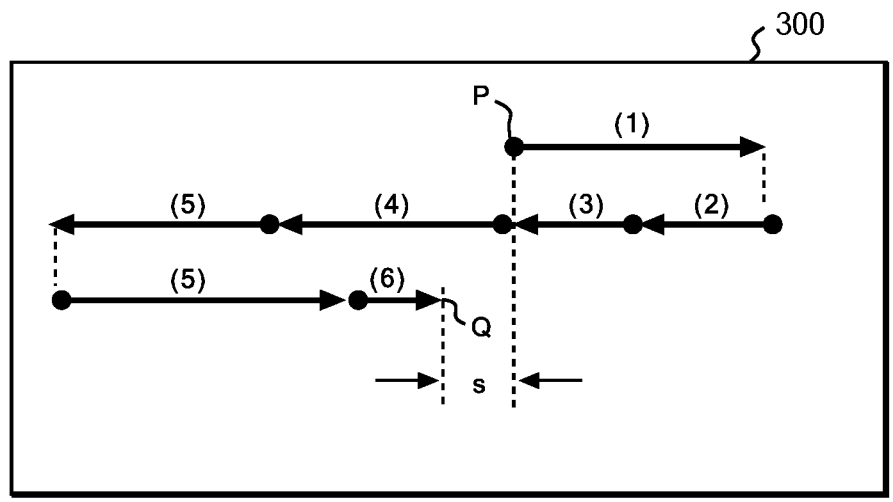
FIG. 7 shows an example of a travel path of a read/write head on the tape medium obtained while the transport speed of the tape medium is switched.

Hereinbelow, specific description will be given of a method for calculating a required time to be stored in the required time table 438 with reference to FIG. 7. FIG. 7 shows a travel path of the read/write head 120 on the tape medium 300 obtained while the transport speed of the tape medium 300 is shifted from the first transport speed Vc to the second transport speed Vn, which is one-level higher than the transport speed Vc. The arrow (1) represents a travel path obtained from when the tape medium 300 transported at the transport speed Vc starts to decelerate until when it pauses. A time t1 required for the travel represented by the arrow (1) is Vc/A, where an acceleration rate is A. The arrow (2) represents a travel path obtained from when the tape medium 300 gets transported backward (in a direction opposite to the normal transport direction) so as to be rewound after being stopped until when the transport speed of the tape medium 300 reaches a speed Vb. A time t2 required for the travel represented by the arrow (2) is Vb/A, where an acceleration rate is A. The arrow (3) represents a travel path obtained from when the tape medium 300 gets transported back at the speed Vb until when the read/write head 120 returns to a deceleration start position P. A time t3 required for the travel represented by the arrow (3) is $\{(Vc/2)*(Vc/A)-(Vb/2)*(Vb/A)\}/Vb$, where an acceleration rate is A.

The arrow (4) represents a travel path obtained while the tape medium 300 is transported back in the speed Vb so as to be rewound by a length required for an adjustment that allows the read/write head 120 to reach a write or read start position Q after the transportation of the tape medium 300 gets stabilized at the target transport speed Vn. A time required for the travel represented by the arrow (4) is assumed to be t4. Note that the read start position Q is always located before the deceleration start position P. This is because there is a time lag from when the tape medium 300 is determined to need to decelerate to when the tape medium 300 actually starts to decelerate, and because data starts to be read out at either a position where the read/write head 120 exists when the tape medium 300 is determined to need to decelerate, or a position slightly before the position. On the other hand, the write start position Q is not always located before the deceleration start position P. This is because, though there is a time lag till when the tape medium 300 actually starts to decelerate also during the data write operation, data starts to be written in at a position slightly after a position where the read/write head 120 exists when the tape medium 300 is determined to need to decelerate. Note that a definite tendency of the position where data starts to be written can be found from observed values.

The arrow (5) represents a travel path obtained from when the tape medium 300 having been transported back at the speed Vb starts to decelerate to be stopped to when the transport speed of the tape medium 300 becomes the speed Vn in the normal transport direction. A time t5 required for the travel represented by the arrow (5) is Vn/A+Vb/A, where an acceleration rate is A. The arrow (6) represents a travel path obtained from when the tape medium 300 gets transported at the transport speed Vn until when the transportation of the tape medium 300 gets stabilized at the target transport speed Vn. A time required for the travel represented by the arrow (6) is assumed to be t6.

With t1 to t6 determined above, a required time Tr is finally obtained from the following equation: Tr=Vc/A+Vb/A+{(Vc/2)*(Vc/A)−(Vb/2)*(Vb/A)}/Vb+t4+Vn/A+Vb/A+t6. Note that the absolute value of each acceleration rate A at which the tape medium 300 decelerates or accelerates is constant. In the tape drive 100 according to this embodiment, the acceleration rate A is defined and used within an available range based on: a torque the motor 135 included in the hardware can generate; the weight of the tape medium 300; and the radius thereof. Meanwhile, the time t6 is defined as such a constant value required for stable operation of the tape drive 100. Specifically, t6 is defined in consideration of a time from when the tape medium 300 starts to be transported at a constant speed until when the positioning of the read/write head 120 is completed by using sufficient information obtained from the corresponding servo tracks. In this embodiment, the acceleration rate A and the speed t6 is previously stored in the storage 435.

On the other hand, the time t4 can be expressed using Vb by the equality of: the sum of the length of the path represented by the arrow (4) and the length of the distance moved in the backward direction of the path represented by the arrow (5); and the sum of a length s equivalent to the difference between the deceleration start position P and the write or read start position Q, a length of the distance moved in the forward direction of the path represented by the arrow (5) and a length of the path represented by the arrow (6) (where the acceleration rate A and the time t6 are assumed to be given values since they are previously determined as described above). Meanwhile, Vb can be determined as such a value that minimizes the right-hand side of the above equation for the required time Tr so as to reduce the time required for each back hitch. Since t4 can be expressed using Vb, if Vb is determined, t4 is determined, too. As described above, for each pair of first and second transport speeds at which the transport unit 139 can be caused to operate, a time required to switch from the first transport speed to the second transport speed is previously calculated, and the calculated required times are previously stored in the form of the required time table 438 in the storage 435.

If the mode selection unit 405 selects the speed switch mode, the transport speed setting unit 410 selects a predetermined transport speed of the tape medium 300 from multiple transport speeds at which the transport unit 139 can be caused to operate, and causes the transport unit 139 to operate at the selected transport speed, at the beginning of each of the data write and read operations. Here, the predetermined transport speed to be employed at the beginning of a data write operation is the first transport speed while the predetermined transport speed to be employed at the beginning of a data read operation is the second transport speed. On the other hand, if the mode selection unit 405 selects the constant speed mode, the transport speed setting unit 410 causes the transport unit 139 to operate at the second transport speed at the beginning of each of the data write and read operations. Upon receiving the adjustment mode selection result and the first transfer rate value from the mode selection unit 405, the transport speed setting unit 410 selects one from the predetermined transport speeds described above by, for example, determining the current first and second transport speeds 441 corresponding to the received first transfer rate value with reference to the association table 437. Note that the transport speed setting unit 410 stores the current first and second transport speeds 441 determined as above into the buffer 440 which is implemented by the RAM 154 shown in FIG. 1.

If the mode selection unit 405 selects the speed switch mode, the required time obtaining unit 415 obtains, from the required time table 438, a time required to switch the transport speed of the tape medium 300 from the current first transport speed to the current second transport speed, which is one-level higher than the current first transport speed, in response to this selection. Note that the required time obtaining unit 415 obtains the current first and second transport speeds 441 from the buffer 440. Together with the first transfer rate value the required time obtaining unit 415 has received from the mode selection unit 405, the required time obtained by the required time obtaining unit 415 is given to the threshold calculation unit 420 to be described below.

During the data write operation, the threshold calculation unit 420 calculates, from the first transfer rate and the required time received from the required time obtaining unit 415, a data volume expected to be received from the host device 200 during the switch of the transport speed of the tape medium 300, as a first threshold. Specifically, the threshold calculation unit 420 calculates the product of the first transfer rate and the required time as the first threshold. Similarly, during the data read operation, the threshold calculation unit 420 calculates, as a second threshold, a data volume expected to be transmitted to the host device 200 during the switch of the transport speed, from the first transfer rate and the required time received from the required time obtaining unit 415. Specifically, the threshold calculation unit 420 calculates the product of the first transfer rate and the required time as the second threshold. The first and second thresholds calculated by the threshold calculation unit 420 are given to the monitoring unit 425 to be described below.

The monitoring unit 425 in the speed switch mode monitors an available data storage capacity of the buffer memory 110, and outputs a first switch notice if the available data storage capacity reaches the first threshold received from the threshold calculation unit 420 while data is written at the first transport speed. In addition, the monitoring unit 425 in the speed switch mode also outputs a second switch notice if the available data storage capacity of the buffer memory 110 reaches the initial capacity of the buffer memory 110 while data is written at the second transport speed.

Similarly, the monitoring unit 425 in the speed switch mode monitors a data volume stored in the buffer memory 110, and outputs the first switch notice if the data volume reaches the second threshold received from the threshold calculation unit 420 while data is read out at the first transport speed. In addition, the monitoring unit 425 in the speed switch mode also outputs the second switch notice if the data volume stored in the buffer memory 110 reaches the initial capacity of the buffer memory 110 while data is read out at the second transport speed.

Meanwhile, the monitoring unit 425 in the constant speed mode outputs a third switch notice if the available data storage capacity of the buffer memory 110 reaches the initial capacity of the buffer memory 110 while data is written at the second transport speed. In addition, the monitoring unit 425 in the constant speed mode also outputs a fourth switch notice if a data volume stored in the buffer memory 110 reaches the initial capacity of the buffer memory 110.

Similarly, the monitoring unit 425 in the constant speed mode outputs the third switch notice if a data volume stored in the buffer memory 110 reaches the initial capacity of the buffer memory 110 while data is read out at the second transport speed. In addition, the monitoring unit 425 in the constant speed mode also outputs the fourth switch notice if an available data storage capacity of the buffer memory 110 reaches the initial capacity of the buffer memory 110.

In response to the first switch notice during the data write and read operations, the speed adjustment unit 430 stops the movement of the read/write head 140 and causes the transport unit 139 to operate at the second transport speed. In addition, in response to the second switch notice during the data write and read operations, the speed adjustment unit 430 stops the movement of the read/write head 140 and causes the transport unit 139 to operate at the first transport speed. Moreover, in response to the third switch notice during the data write and read operations, the speed adjustment unit 430 stops the movement of the read/write head 140. In addition, in response to the fourth switch notice during the data write and read operations, the speed adjustment unit 430 causes the transport unit 139 to operate at the second transport speed. Note that the speed adjustment unit 430 obtains the current first and second transport speeds from the buffer 440.

Figure 8:
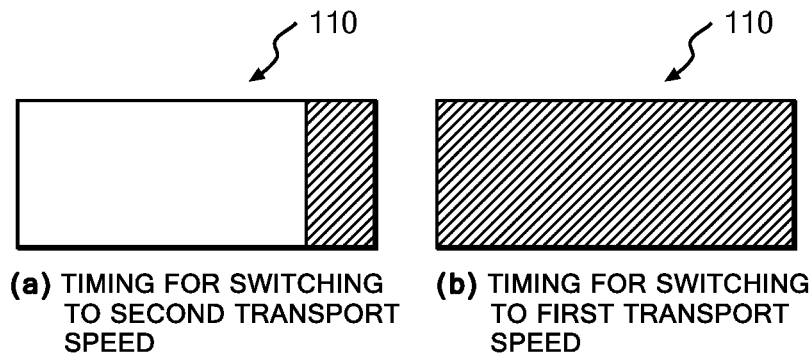
FIG. 8A shows an example of a state of the buffer memory at a timing when the transport speed of the tape medium starts to be switched to the second transport speed during the data write operation.
FIG. 8B shows an example of a state of the buffer memory at a timing when the transport speed starts to be switched to the first transport speed during the data write operation.

FIGS. 8A and 8B each show a state of the buffer memory 110 at a timing when the speed adjustment unit 430 starts to switch the transport speed of the tape medium 300 during the data write operation in the speed switch mode. In each of FIGS. 8A and 8B, a rectangle represents the storage capacity of the buffer memory 110, and a shaded area represents an available capacity of the buffer memory 110 and thus includes no data at that time. As described previously, when the tape drive 100 in the speed switch mode starts to write data into the tape medium 300, the tape drive 100 is caused to operate at the first transport speed that makes the transfer rate to the tape medium 300 lower than the transfer rate from the host device 200. Thus, in an earlier phase of this data write operation, data transmitted from the host device 200 is accumulated in the buffer memory 110. Then, the speed adjustment unit 430 switches the transport speed to the second transport speed, which is one-level higher than the first transport speed, at a timing when the available capacity of the buffer memory 110 becomes equivalent to a data volume expected to be received from the host device 200 during the switch of the transport speed, as shown in FIG. 8A.

Here, the one-level higher second transport speed makes the transfer rate to the tape medium 300 higher than the transfer rate from the host device 200, as described previously. Thus, after the transport speed of the tape medium 300 is switched to the second transport speed, the data accumulated in the buffer memory 110 is reduced by being written into the tape medium 300. Then, the speed adjustment unit 430 switches the transport speed to the first transport speed, which is one-level lower than the second transport speed, at a timing when the available capacity of the buffer memory 110 reaches the initial capacity of the buffer memory 110, as shown in FIG. 8B. In this way, in the speed switch mode, the tape drive 100 according to the present invention repeatedly switches the transport speed of the tape medium 300 between the first and second transport speeds, and thereby prevents decrease in data transfer efficiency between the tape drive 100 and the host device 200.

Figure 9:
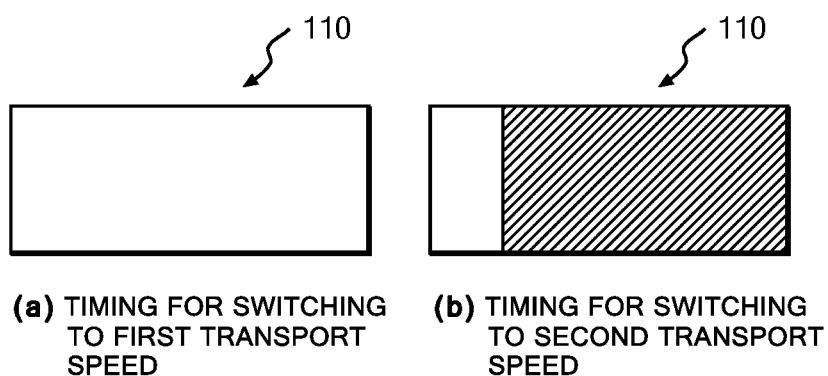
FIG. 9A shows an example of a state of the buffer memory at a timing when the transport speed of the tape medium starts to be switched to the first transport speed during the data read operation.
FIG. 9B shows an example of a state of the buffer memory at a timing when the transport speed starts to be switched to the second transport speed during the data read operation.

FIGS. 9A and 9B each show a state of the buffer memory 110 at a timing when the speed adjustment unit 430 starts to switch the transport speed of the tape medium 300 during the data read operation in the speed switch mode. In each of FIGS. 9A and 9B, a rectangle represents the storage capacity of the buffer memory 110, and a shaded area represents an available capacity of the buffer memory 110 and thus includes no data at that time. As described previously, when the tape drive 100 in the speed switch mode starts to read data from the tape medium 300, the tape drive 100 is caused to operate at the second transport speed that makes the transfer rate from the tape medium 300 higher than the transfer rate to the host device 200. Thus, in an earlier phase of this data read operation, data read out from the tape medium 300 is accumulated in the buffer memory 110. Then, the speed adjustment unit 430 switches the transport speed to the first transport speed, which is one-level lower than the second transport speed, at a timing when the data volume stored in the buffer memory 110 reaches the initial capacity of the buffer memory 110, as shown in FIG. 9A.

Here, the one-level lower first transport speed makes the transfer rate from the tape medium 300 lower than the transfer rate to the host device 200, as described previously. Thus, after the transport speed of the tape medium 300 is switched to the first transport speed, the data accumulated in the buffer memory 110 is reduced by being transmitted to the host device 200. Then, the speed adjustment unit 430 switches the transport speed to the second transport speed, which is one-level higher than the first transport speed, at a timing when the data volume stored in the buffer memory 110 becomes equivalent to the data volume expected to be transmitted to the host device 200 during the switch of the transport speed, as shown in FIG. 9B. In this way, in the speed switch mode, the tape drive 100 according to the present invention repeatedly switches the transport speed of the tape medium 300 between the first and second transport speeds, and thereby prevents decrease in data transfer efficiency between the tape drive 100 and the host device 200.

Figure 10:
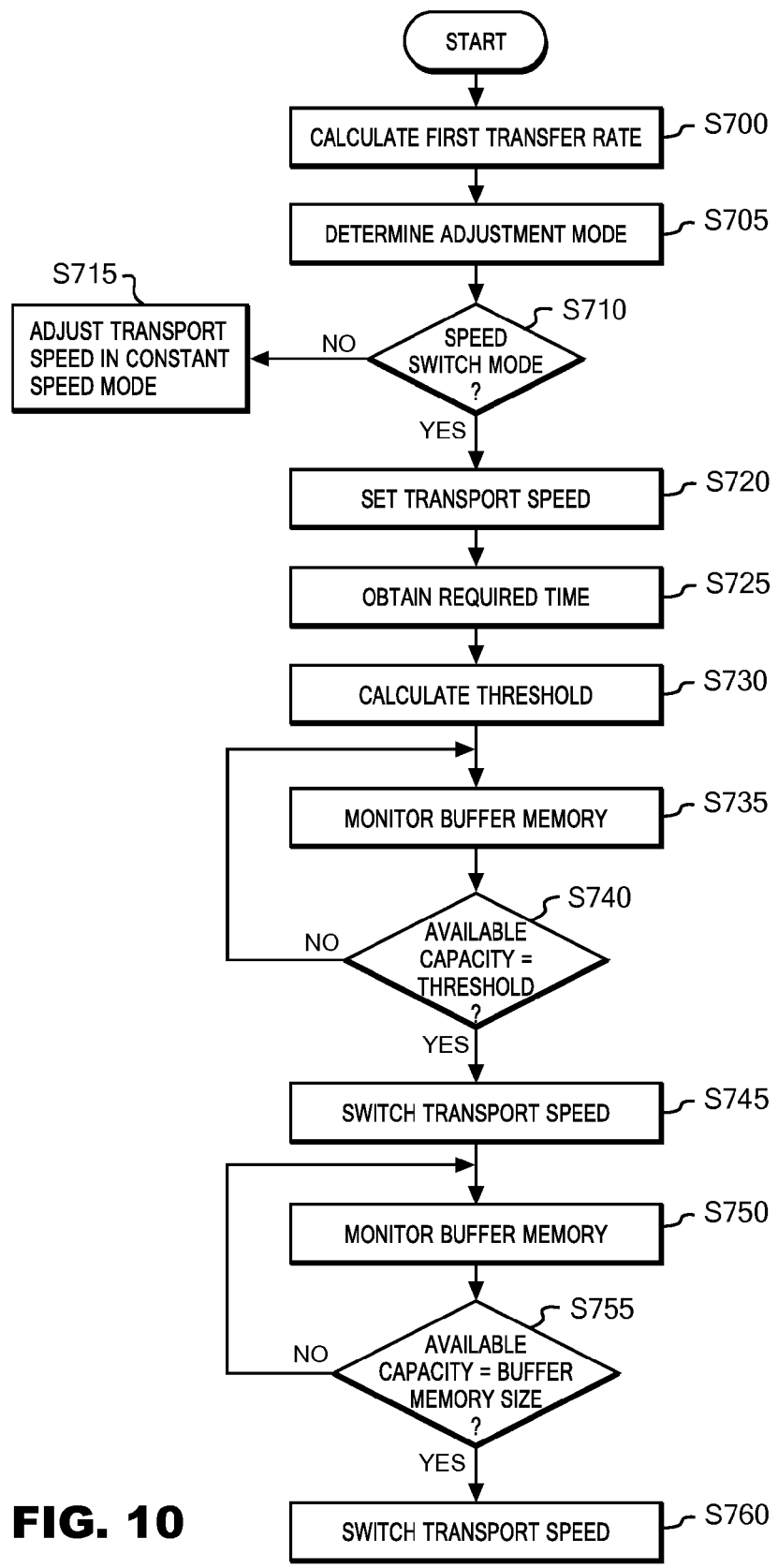
FIG. 10 is a flowchart showing an example of a processing flow in which the controller according to the embodiment of the present invention adjusts the transport speed of the tape medium during the data write operation.

Next, description will be given of an operation that the tape drive 100 according to this embodiment performs to adjust the transport speed of the tape medium 300 with reference to flowcharts shown in FIGS. 10 and 11. FIG. 10 shows an example of a processing flow in which the tape drive 100 adjusts the transport speed during the data write operation. In FIG. 10, the process starts at a step of starting the data write operation, and the tape drive 100 then calculates the data transfer rate from the host device 200, that is, the first transfer rate (step 700). Thereafter, the tape drive 100 determines which adjustment modes of the transport speed of the tape medium 300 to employ (step 705), and determines whether or not the determined mode in step 705 is the speed switch mode, in step 710.

When determining that the determined mode in step 705 is the constant speed mode (step 710: NO), the tape drive 100 adjusts the transport speed of the tape medium 300 according to the conventional constant speed mode (step 715). Specifically, when transporting the tape medium 300, the tape drive 100 constantly transports it at the second transport speed. Then, if the buffer memory 110 empties, the tape drive 100 stops the tape medium 300 until the buffer memory 110 becomes filled with data. Here, the second transport speed is the lowest speed of one or more transport speeds at which the tape drive 100 can be caused to operate under a condition that the second transfer rate is higher than the first transfer rate, as described above. The tape drive 100 repeats these transport speed adjustment steps until this data write operation is completed. On the other hand, when determining that the determined mode in step 705 is the speed switch mode (step 710: YES), the tape drive 100 transports the tape medium 300 at the first transport speed (step 720). Here, the first transport speed is the highest speed of one or more transport speeds at which the tape drive 100 can be caused to operate under a condition that the second transfer rate is lower than the first transfer rate.

Then, the tape drive 100 obtains a time required to switch the transport speed of the tape medium 300 from the current transport speed, that is, the first transport speed, to the second transport speed, which is one-level higher than the first transport speed (step 725). Thereafter, based on the first transfer rate and the obtained required time, the tape drive 100 calculates, as a threshold, a data volume expected to be received from the host device 200 while the transport speed is switched from the first transport speed to the second transport speed (step 730).

While writing data into the tape medium 300 at the first transport speed, the tape drive 100 monitors an available data storage capacity of the buffer memory 110 in parallel (step 735). Then, the tape drive 100 determines whether or not the available capacity reaches the threshold (step 740). If the available capacity does not reach the threshold (step 740: NO), the process returns to step 735, and the tape drive 100 continues to monitor the buffer memory 110.

On the other hand, if the available capacity reaches the threshold in step 740, the tape drive 100 switches the transport speed of the tape medium 300 to the second transport speed which is one-level higher than the current transport speed (step 745). After the transport speed is switched, the tape drive 100 continues to monitor the buffer memory 110 (step 750), and determines whether or not the available capacity reaches the initial capacity of the buffer memory 110 (step 755).

If the available capacity does not reach the initial capacity of the buffer memory 110 (step 755: NO), the process returns to step 750, and the tape drive 100 continues to monitor the buffer memory 110. On the other hand, if the available capacity reaches the initial capacity of the buffer memory 110 (step 755: YES), the tape drive 100 switches the transport speed of the tape medium 300 to the first transport speed, which is one-level lower than the current transport speed (step 760). Then, the process returns to step 735, and the tape drive 100 repeats steps 735 to 760 until this data write operation is completed.

Figure 11:
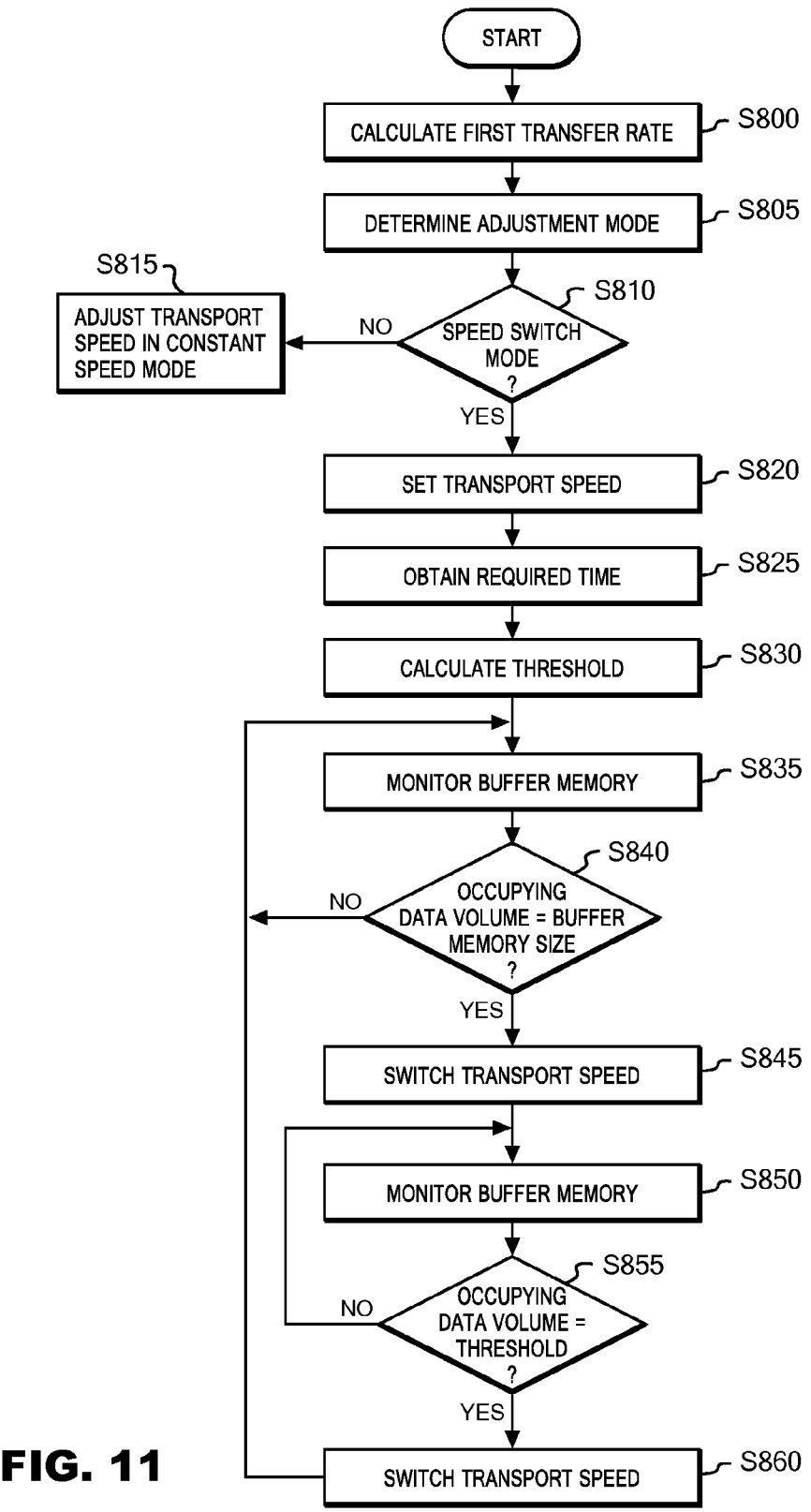
FIG. 11 is a flowchart showing an example of a processing flow in which the controller according to the embodiment of the present invention adjusts the transport speed of the tape medium during the data read operation.

FIG. 11 shows an example of a processing flow in which the tape drive 100 adjusts the transport speed of the tape medium 300 during the read write operation. In FIG. 11, the process starts at a step of starting the data read operation, and the tape drive 100 then calculates the data transfer rate to the host device 200, that is, the first transfer rate (step 800). Thereafter, the tape drive 100 determines which adjustment modes of the transport speed of the tape medium 300 to employ (step 805), and determines whether or not the determined mode in step 805 is the speed switch mode, in step 810.

When determining that the determined mode in step 805 is the constant speed mode (step 810: NO), the tape drive 100 adjusts the transport speed of the tape medium 300 according to the conventional constant speed mode (step 815). Specifically, when transporting the tape medium 300, the tape drive 100 constantly transports it at the second transport speed. Then, if the buffer memory 110 becomes filled with data, the tape drive 100 stops the tape medium 300 until the buffer memory 110 empties. Here, the second transport speed is the lowest speed of one or more transport speeds at which the tape drive 100 can be caused to operate under a condition that the second transfer rate is higher than the first transfer rate, as described above. The tape drive 100 repeats these transport speed adjustment steps until this data read operation is completed. On the other hand, when determining that the determined mode in step 805 is the speed switch mode (step 810: YES), the tape drive 100 transports the tape medium 300 at the second transport speed (step 820). Here, the second transport speed is the lowest speed of one or more transport speeds at which the tape drive 100 can be caused to operate under a condition that the second transfer rate is higher than the first transfer rate.

Then, the tape drive 100 obtains a time required to switch the transport speed of the tape medium 300 from the current transport speed, that is, the second transport speed, to the first transport speed, which is one-level lower than the second transport speed (step 825). Thereafter, based on the first transfer rate and the obtained required time, the tape drive 100 calculates, as a threshold, a data volume expected to be transmitted to the host device 200 while the transport speed is switched from the second transport speed to the first transport speed (step 830).

While reading out data from the tape medium 300 at the second transport speed, the tape drive 100 monitors a data volume occupying the buffer memory 110 in parallel (step 835). Then, the tape drive 100 determines whether or not the occupying data volume reaches the initial capacity of the buffer memory 110 (step 840). If the occupying data volume does not reach the buffer memory 110 (step 840: NO), the process returns to step 835, and the tape drive 100 continues to monitor the buffer memory 110.

On the other hand, if the occupying data volume reaches the initial capacity of the buffer memory 110 in step 840, the tape drive 100 switches the transport speed of the tape medium 300 to the first transport speed which is one-level lower than the current transport speed (step 845). After the transport speed is switched, the tape drive 100 continues to monitor the buffer memory 110 (step 850), and determines whether or not the occupying data volume reaches the threshold (step 855).

If the occupying data volume does not reach the threshold (step 855: NO), the process returns to step 850, and the tape drive 100 continues to monitor the buffer memory 110. On the other hand, if the available capacity reaches the threshold (step 855: YES), the tape drive 100 switches the transport speed of the tape medium 300 to the second transport speed which is one-level higher than the current transport speed (step 860). Then, the process returns to step 835, and the tape drive 100 repeats steps 835 to 860 until this data read operation is completed.

Hereinabove, the present invention has been described by using the embodiment, but the technical scope of the present invention is not limited to what is described in the above embodiment. For example, the tape drive 100 to which the present invention is applied may be configured: to encrypt data transmitted from the host device 200 and write the encrypted data into the tape medium 300; and to decrypt data read out from the tape medium 300 and transmit the decrypted data to the host device 200. In this case, V/t may be calculated as the first transfer rate during the data write operation from an encrypted data volume V stored in the buffer memory 110 in a time span t. Similarly, V/t may be calculated as the first transfer rate during the data read operation from a decrypted data volume V read out from the buffer memory 110 in a time span t. Note that there is no problem to ignore a time required for this data encryption/decryption since the data encryption/decryption is executed by hardware as similar to the data compression/decompression and the error correction. It will be apparent to those skilled in the art that the above embodiment can be modified and improved in various ways as described above. Thus, as a matter of course, such other modified or improved embodiments are also included in the technical scope of the present invention.

What is claimed is:

1. A transport speed adjustment method to be employed in a tape drive capable of switching a transport speed of a tape medium among multilevel speeds, the method comprising the steps of:

receiving data from a host device through a network;
temporarily storing the received data in a buffer memory;
transporting the tape medium in a longitudinal direction thereof;
writing the data in the buffer memory into a track formed to extend in a transport direction of the tape medium;
calculating a first transfer rate, which is a data transfer rate between the host device and the tape drive;
selecting, from adjustment modes consisting of a speed switch mode and a constant speed mode, an adjustment mode corresponding to the calculated first transfer rate, by referring to a mode selection table in which such an adjustment mode more effective in reducing back hitches is defined in accordance with the first transfer rate, the transport speed being switched between a first transport speed and a second transport speed in the speed switch mode, the transport speed being fixed at the second transport speed in the constant speed mode, the first transport speed being a highest speed of one or more transport speeds at which the tape drive can be caused to operate under a condition that a second transfer rate, which is a data transfer rate between the buffer memory and the tape medium, is lower than the first transfer rate, the second transport speed being one-level higher than the first transport speed;
causing the tape drive to operate at the first transport speed at a beginning of data writing, in response to selection of the speed switch mode;
obtaining a time required to switch the transport speed of the tape medium from the first transport speed to the second transport speed, in response to the selection of the speed switch mode;
calculating, from the first transfer rate and the required time, a data volume expected to be received from the host device during switch of the transport speed, as a threshold;
monitoring whether or not an available data storage capacity of the buffer memory reaches the threshold while data is written at the first transport speed in the speed switch mode; and
stopping writing the data and switching the transport speed of the tape medium to the second transport speed, in response to a monitoring result that the available capacity reaches the threshold.

2. The method according to claim 1, further comprising:
compressing the received data before the data is stored in the buffer memory, wherein
calculating includes calculating V/T as the first transfer rate, from a data volume V stored in the buffer memory in a time span T.

3. The method according to claim 1, wherein
the monitoring includes monitoring an available data storage capacity of the buffer memory while data is written at the second transport speed in the speed switch mode, and outputting a switch notice if the available capacity reaches an initial capacity of the buffer memory.

4. The method according to claim 1, wherein the required time includes:
a time required to pause transportation of the tape medium;
a time required to rewind the tape medium for positioning; and
a time required to set the transport direction of the tape medium back to a normal transport direction and to switch the transport speed from the first transport speed to the second transport speed.

5. The method according to claim 1, further comprising:
storing in a storage a table in which each of the multilevel speeds is associated with the second transfer rate, the second transfer rate being selected when the tape drive is caused to operate at the transport speed, and determining a transport speed at which the transport medium is caused to operate, by referring to the table.

6. The method according to claim 5, further comprising:
adding management information to the data stored in the buffer memory, the management information being used for managing the data; and
adding error correction information to the data stored in the buffer memory, the error correction information being used for performing error correction on the data, wherein
as the second transfer rate, V/T is calculated from a data volume V firstly processed by adding the management information and the correction information and then transmitting to the tape medium in a time span T.

7. A transport speed adjustment method to be employed in a tape drive capable of switching a transport speed of a tape medium among multilevel speeds, the method comprising the steps of:
transporting the tape medium in a longitudinal direction thereof;
reading out data recorded in a track formed to extend in a transport direction of the tape medium;
temporarily storing the read out data in a buffer memory;
transmitting the data in the buffer memory to a host device through a network;
calculating a first transfer rate which is a data transfer rate between the host device and the tape drive;
selecting, from adjustment modes consisting of a speed switch mode and a constant speed mode, an adjustment mode corresponding to the calculated first transfer rate, by referring to a mode selection table in which such an adjustment mode more effective in reducing back hitches is defined in accordance with the first transfer rate, the transport speed being switched between a first transport speed and a second transport speed in the speed switch mode, the transport speed being fixed at the second transport speed in the constant speed mode, the first transport speed being a highest speed of one or more transport speeds at which the tape drive can be caused to operate under a condition that a second transfer rate, which is a data transfer rate between the buffer memory and the tape medium, is lower than the first transfer rate, the second transport speed being one-level higher than the first transport speed;
obtaining a time required to switch the transport speed of the tape medium from the first transport speed to the second transport speed, in response to the selection of the speed switch mode;
calculating, from the first transfer rate and the required time, a data volume expected to be transmitted to the host device during switch of the transport speed, as a threshold;
monitoring whether or not a data volume stored in the buffer memory reaches the threshold while data is read out at the first transport speed in the speed switch mode; and
stopping reading out the data and switching the transport speed of the tape medium to the second transport speed, in response to monitoring result that the data volume reaches the threshold.

8. The method according to claim 7, further comprising:
decompressing the data read out from the buffer memory before the data is transmitted to the host device;
recording the decompressed data in the tape medium; and
calculating V/T as the first transfer rate, from a data volume V forwarded from the buffer memory in a time span T.

9. The method according to claim 7, wherein the required time includes:
a time required to pause transportation of the tape medium;
a time required to rewind the tape medium for positioning; and
a time required to set the transport direction of the tape medium back to a normal transport direction and to switch the transport speed from the first transport speed to the second transport speed.

10. The method according to claim 7, further comprising:
operating at the second transport speed at the beginning of data reading, wherein
the monitoring includes monitoring a data volume stored in the buffer memory while data is read out at the second transport speed in the speed switch mode, and outputting a switch notice if the data volume reaches an initial capacity of the buffer memory.

11. The method according to claim 7, further comprising:
storing in a storage table in which each of the multilevel speeds is associated with the second transfer rate, the second transfer rate being selected when the tape drive is caused to operate at the transport speed; and
determining a transport speed at which the taep medium is caused to operate, by referring to the table.

12. The method according to claim 11, further comprising:
performing error correction on the data stored in the buffer memory, wherein
as the second transfer rate stored in the table, V/T is calculated from a data volume V firstly read out from the tape medium to the buffer memory and then processed by the error correction means in a time span T.

* * * * *